US010143918B2

(12) United States Patent
Hodgson et al.

(10) Patent No.: US 10,143,918 B2
(45) Date of Patent: Dec. 4, 2018

(54) APPARATUS, SYSTEM AND METHOD FOR ENHANCING A GAMING EXPERIENCE

(71) Applicant: PlayFusion Limited, Cambridge (GB)

(72) Inventors: Riaan Hodgson, Northants (GB); David Gomberg, New York, NY (US); Mark Gerhard, Waresley (GB)

(73) Assignee: PLAY FUSION LIMITED, Cambridge (GB)

(*) Notice: Subject to any disclaimer, the term of this patent is extended or adjusted under 35 U.S.C. 154(b) by 12 days.

(21) Appl. No.: 15/637,648

(22) Filed: Jun. 29, 2017

(65) Prior Publication Data
US 2018/0021675 A1    Jan. 25, 2018

Related U.S. Application Data

(60) Provisional application No. 62/365,777, filed on Jul. 22, 2016.

(51) Int. Cl.
| *A63H 3/00* | (2006.01) |
| *A63F 13/245* | (2014.01) |
| *A63F 13/323* | (2014.01) |
| *A63F 13/65* | (2014.01) |
| *A63F 13/98* | (2014.01) |
| *A63F 13/42* | (2014.01) |
| *A63F 13/21* | (2014.01) |

(52) U.S. Cl.
CPC ............ *A63F 13/245* (2014.09); *A63F 13/21* (2014.09); *A63F 13/323* (2014.09); *A63F 13/42* (2014.09); *A63F 13/65* (2014.09); *A63F 13/98* (2014.09); *A63H 3/003* (2013.01); *A63H 2200/00* (2013.01)

(58) Field of Classification Search
CPC .......... A63H 3/003; A63H 3/36; A63H 33/26; A63H 2200/00; A63F 13/245
See application file for complete search history.

(56) References Cited

U.S. PATENT DOCUMENTS

| 4,820,233 | A | * | 4/1989 | Weiner | ................ | G09B 5/062 |
| | | | | | | 446/303 |
| 4,869,701 | A | * | 9/1989 | Kawai | .................. | A63H 3/16 |
| | | | | | | 273/156 |
| 5,766,077 | A | * | 6/1998 | Hongo | ................ | A63F 13/02 |
| | | | | | | 273/148 B |

(Continued)

*Primary Examiner* — Alyssa Hylinski
(74) *Attorney, Agent, or Firm* — Hauptman Ham, LLP

(57) ABSTRACT

An apparatus comprises a housing configured to be added to a body associated with a software application implemented by a computer. The apparatus also comprises a sensor, a transceiver, a power supply, a memory, and a processor inside the housing. The processor is communicatively coupled with the sensor, the transceiver, the power supply, and the memory. The processor is configured to be communicatively coupled with the computer by way of the transceiver based, at least in part, on a determination that the housing is added to the body. The processor is also configured to cause the computer to generate a virtual representation of the body in a virtual reality viewable by way of a display associated with the computer. The processor is further configured to cause the computer to orient the virtual representation of the body in the virtual reality based on data collected by the sensor.

19 Claims, 10 Drawing Sheets

(56) References Cited

U.S. PATENT DOCUMENTS

| | | | | |
|---|---|---|---|---|
| 6,160,540 | A * | 12/2000 | Fishkin | A63F 13/00 345/156 |
| 6,257,948 | B1 * | 7/2001 | Silva | A63H 3/28 446/100 |
| 6,290,565 | B1 * | 9/2001 | Galyean, III | A63H 3/16 273/148 B |
| 6,460,851 | B1 * | 10/2002 | Lee | A63F 3/00643 273/238 |
| 6,991,509 | B1 * | 1/2006 | Carley | A63H 5/00 434/334 |
| 7,081,033 | B1 * | 7/2006 | Mawle | A63F 13/02 446/175 |
| 7,843,471 | B2 * | 11/2010 | Doan | A63F 1/04 345/418 |
| 8,257,157 | B2 * | 9/2012 | Polchin | A63F 13/02 463/9 |
| 8,858,339 | B2 * | 10/2014 | Reiche | A63F 13/12 463/42 |
| 9,289,691 | B2 * | 3/2016 | Leyland | A63F 13/02 |
| 9,833,695 | B2 * | 12/2017 | Yano | A63F 9/24 |
| 2002/0111808 | A1 * | 8/2002 | Feinberg | A63H 3/28 704/270.1 |
| 2002/0183119 | A1 * | 12/2002 | Fessler | A63F 13/02 463/47 |
| 2013/0196766 | A1 * | 8/2013 | Leyland | A63F 9/24 463/36 |

* cited by examiner

APPARATUS, SYSTEM AND METHOD FOR ENHANCING A GAMING EXPERIENCE

CROSS-REFERENCE

The present application is a Nonprovisional of U.S. Provisional Application No. 62/365,777, filed Jul. 22, 2016, the disclosure of which is hereby incorporated by reference herein in its entirety. The present application is related to International Patent Application No. PCT/US16/20076, filed Feb. 29, 2016, which is incorporated by reference herein in its entirety.

BACKGROUND

Game developers and toy manufacturers are continually challenged to develop new and interesting ways for users to interact with games and toys. Some games, such as video games, often involve the portrayal of characters in a virtual world. Users typically control and/or develop characters in a context of a game via interaction with a game controller such as a control pad or joystick.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
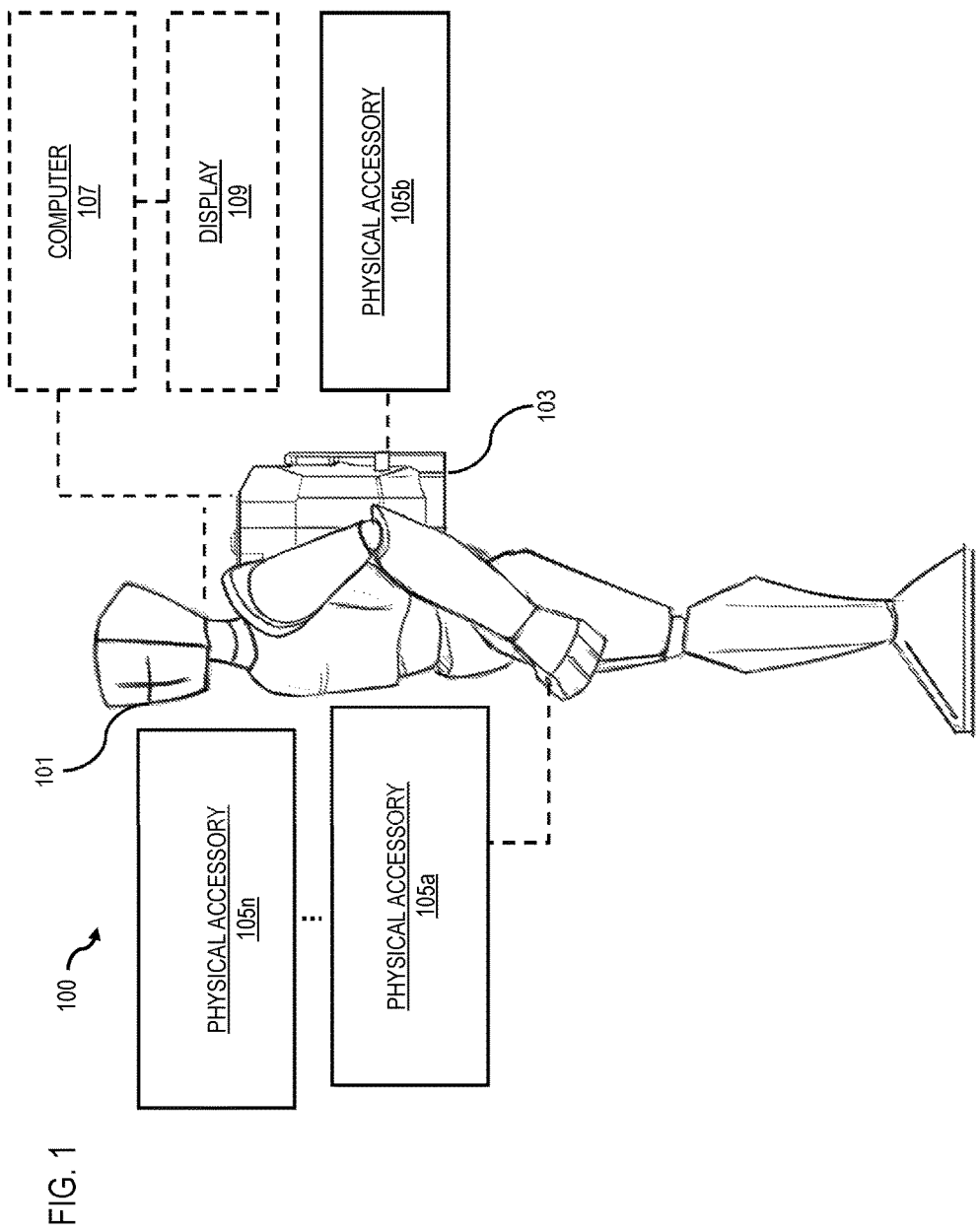
FIG. 1 is a diagram of a gaming system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a side view of a system 100 for interacting with a software application implemented by a computer, in accordance with one or more embodiments.

System 100 comprises one or more action figures 101 (collectively referred to as "action figure 101" where appropriate), one or more cores 103 (collectively referred to as "core 103" where appropriate), and one or more physical accessories 105a-n (collectively referred to as "physical accessory 105" where appropriate). System 100 makes it possible for a user to control a virtual version of a real-world, physical object, represented in a virtual reality environment.

One or more of the action figure 101, the core 103, or the one or more physical accessories 105 is configured to be communicatively coupled with a computer 107. The computer 107 is configured to output an image associated with a software application implemented by the computer 107 to a display 109. An image output by the display 109 includes a virtual reality within which at least one of a virtual version of the action figure 101, a virtual version of the core 103 or a virtual version of the one or more physical accessories 105 is displayed.

Action figure 101 is a real-world character or object that has a corresponding virtual version that is capable of being represented in the virtual reality environment provided via the computer 107. The action figure 101 is an object having a body. In some embodiments, the action figure 101 is a humanoid doll, robot, animal, or other suitable creature having at least one of one or more bodies, one or more heads, one or more arms, one or more legs, one or more tails, or one or more other suitable appendages or organs. In some embodiments, action figure 101 is a vehicle or a vessel. In some embodiments, action figure 101 is configured to change shape from one form to another. For example, if the action figure 101 is a humanoid doll, in some embodiments, the action figure 101 is configured to be rearranged into a different form such as an animal, vehicle, vessel, combination thereof, or other suitable form.

In some embodiments, the action figure 101 comprises one or more of a gyroscope, a magnetometer, an accelerometer, a microphone, a camera, other suitable sensor, an RFID tag, a light source, a power source, a processor, a memory, a communication module, a speaker, a vibration device, one or more motors, one or more batteries, one or more power sources, or other suitable component(s).

In some embodiments, core 103 comprises one or more of a gyroscope, a magnetometer, an accelerometer, a microphone, a camera, other suitable sensor, an RFID tag, a light source, a power source, a processor, a memory, a communication module, a speaker, a vibration device, one or more motors, or other suitable component(s).

Core 103 is configured to be added to action figure 101. In some embodiments, core 103 is configured to be attached to action figure 101. In some embodiments, at least a portion of core 103 is configured to be inserted into action figure 101. In some embodiments, core 103 is configured to be entirely accommodated within the action figure 101. In some embodiments, the action figure 101 is free from including one or more of the sensors or components included in the core 103 such as a processor, memory and/or communication module. In such a configuration, the action figure 101 is incapable of being communicatively coupled with the computer 107 without the core 103 being added to the action figure 101. As such, if a core 103 comprising, a processor, a memory and/or a communication module is removed from the action figure 101, the action figure 101 is optionally inoperable in the context of the virtual reality environment. But, if the core 103 is added to the action figure 101, the combination of action figure 101 and core 103 is capable of being activated and usable in the context of the virtual reality environment, usable as a controller by which a user is able to interact with the software application implemented by the computer 107, and/or controlled by the computer 107.

A package of core components such as a package of sensors, a processor, a memory and/or a communication module included in the core 103 makes it possible to essentially plug and play core control, communication, sensing and/or power source components into and out of a "dumb" action figure 101 without the need to manufacture the action figure 101 having each and every component necessary for interaction with the computer 107, or to be usable in the context of the virtual reality environment. The core 103 is configured to be hot-swappable between different action figures 101. For example, the core 103 is configured to be added to and removed from two or more different action figures 101.

The action figure 101 is capable of being communicatively coupled with at least one physical accessory 105 that is usable in a context of the virtual reality environment. If the physical accessory 105 is communicatively coupled with the action figure 101, then the computer 107 is indirectly communicatively coupled with the physical accessory 105 by way of at least one of the action figure 101 or the core 103. In some embodiments, at least one physical accessory 105 is communicatively coupled with the core 103. In some embodiments, the physical accessory 105 is optionally directly communicatively coupled with the computer 107. By way of example, the computer 107, the one or more action figures 101, the one or more cores 103 and/or the one or more physical accessories 105 communicate by a wired or wireless communication connection and/or one or more networks, or a combination thereof.

The computer 107 is a type of mobile terminal, fixed terminal, or portable terminal including a desktop computer, laptop computer, notebook computer, netbook computer, tablet computer, wearable circuitry, mobile handset, server, gaming console, or combination thereof. The computer 107 one or more of comprises display 109 or is communicatively coupled with display 109. The computer 107 is configured to provide the virtual reality environment by executing a software application. In some embodiments, executing the software application comprises running a video game, hosting a video game, interacting with a web-based gaming host system or server, or causing a user interface to be displayed with which a user can interact using the system 100. The computer 107 is configured to generate a virtual representation of the action figure 101, a virtual representation of the physical accessory 105 and/or a virtual representation of the core 103 in the context of the virtual reality environment or video game. In some embodiments, the virtual representation of the action figure 101 and/or the virtual representation of the physical accessory 105 is free from having a virtual representation of the core 103 included in the virtual reality environment. In some embodiments, the computer 107 is configured to generate a virtual version of the core 103 in the context of the virtual reality environment.

In some embodiments, the computer 107 is configured to use orientation, movement or other sensor data provided by one or more of the action figure 101, the core 103 or the physical accessory 105 to generate the virtual representation of the action figure 101, the physical accessory 105 and/or the core 103. In some embodiments, the computer 107 is configured to generate the virtual representation of the action figure 101, the physical accessory 105, and/or the core 103 free from a platform or scanner to determine an orientation, position or movement of the action figure 101, the physical accessory 105, and/or the core 103. In some embodiments, the computer 107 is completely free from a physical connection with the action figure 101, the physical accessory 105, and/or the core 103.

In some embodiments, the computer 107 is configured to detect one or more of action figure 101, core 103 or physical accessory 105 within a predetermined proximity such as within a room or a preset distance from the computer 107 based on a type of wireless connection used to communicatively couple the action figure 101 or the core 103 with the computer 107. In some embodiments, the computer 107 is configured to be communicatively coupled with the action figure 101, the core 103 or the physical accessory 105 by way of an immediate connection without having to be paired with the action figure 101, the core 103 or the physical accessory 105. For example, if the computer 107, the action figure 101, the physical accessory 105 and/or the core 103 are capable of communicating over a proprietary wireless network or a wireless technology such as Bluetooth®, the computer 107 is capable of identifying an action figure 101, core 103 or physical accessory 105 with which the computer 107 is configured to be communicatively coupled without additional instruction. In some embodiments, the computer 107 is configured to choose to interact further with a specific action figure 101 or a specific core 103. In some embodiments, only action figure 101, core 103 or physical accessories 105 that are capable of communicating on the proprietary network are capable of interacting with the computer 107, preventing counterfeit products and unsecured access to the computer 107.

In some embodiments, the action figure 101 or the core 103 is configured to detect one or more other action figures 101, one or more other cores 103, or one or more physical accessories 105 within a predetermined proximity. In some embodiments, the action figure 101, the core 103 or the physical accessory 105 is configured to prompt a user to play with the action figure 101, the core 103, the physical accessory 105 or the computer 107 based on a detection of a nearby action figure 101, core 103 or physical accessory 105. In some embodiments, the computer 107, the action figure 101, the core 103, or the physical accessory 105 is configured to detect other action figures 101, cores 103 or physical accessories 105, and to identify that the action figures 101, cores 103, and/or physical accessories 105 within the predetermined proximity as being used within a social circle or group.

Sensor data is recorded and communicated to the computer 107 for processing. For example, orientation and movement data collected by the various sensors included in one or more of the action figure 101, core 103 or physical accessory 105 is usable by the computer 107 to generate a virtual version of the action figure 101, alone, or in combination with one or more of a virtual version of the core 103 or a virtual version of the physical accessory 105 that is oriented in a manner that corresponds to the orientation of action figure 101, core 103 and/or physical accessory 105 in the real world.

In some embodiments, sensor data includes orientation data associated with the physical accessory 105 with respect to the action figure 101 and/or the core 103 such that the virtual version of the physical accessory 105 is represented in the virtual reality environment in a manner that corresponds to the orientation of the physical accessory 105 with respect to the action figure 101 in the real world. Similarly, in some embodiments, sensor data includes orientation data associated with the core 103 with respect to the action figure 101 and/or the physical accessory 105 such that the virtual version of the core 103 is represented in the virtual reality environment in a manner that corresponds to the orientation of the core 103 with respect to the action figure 101 in the real world.

In some embodiments, the sensor data is used to control a movement of the virtual version of the action figure 101, the core 103, and/or the virtual version of the physical accessory 105 in the virtual reality environment. For example, if the action figure 101 is elevated in the real world, sensor data that indicates such a movement is used by the computer 107 to cause the virtual version of the action figure 101 to jump or fly. In some embodiments, sensor data associated with tilting the action figure 101 is processed by the computer 107 to cause the virtual version of the action figure 101 to dodge an attack or run, for example. In some embodiments, the sensor data is exclusively collected by way of sensors included in core 103.

In some embodiments, a processor included in the core 103 is configured to cause the computer 107 to cause the virtual version of the action figure 101 to be controlled based on a detected movement of one or more of the action figure 101, the core 103 or the physical accessory 105, and/or based on sensor data indicative of a user input. A user input, for example, is received by way of an input sensor. In some embodiments, core 103 has the appearance and capabilities of a conventional game controller, but the core 103 is configured to be added to action figure 101 to facilitate inclusion of the action figure 101 in the context of a video game and/or to receive a physical accessory 105.

In some embodiments, the processor of the core 103 is configured to cause the computer 107 to execute an instruction from the memory to detect a contact position between a physical accessory 105 and the action figure 101 based, at least in part, on a communicative coupling of the physical accessory 105 with the action figure 101 and an electrical coupling between the processor of the core 103 and the action figure 101, and/or the core 103 or another physical accessory 105. The processor of the core is also configured to set a function of the physical accessory 105 based on the contact position. The processor of the core 103, in some embodiments, is configured to cause the computer 107 to generate a virtual representation of the physical accessory 105 in the virtual reality, and cause the computer to orient a virtual version of the physical accessory 105 with respect to a virtual version of the action figure 101 based on the contact position, thereby causing the virtual version of the physical accessory 105 to be usable in accordance with the function of the physical accessory 105.

Physical accessories 105 are real-world objects that are capable of being communicatively coupled with one or more of the action figure 101, the core 103, the computer 107 or one or more other physical accessories 105. Physical accessories 105 have a corresponding virtual version that is capable of being represented in the virtual reality environment provided via the computer 107. Physical accessory 105 comprises an object and a communication module. In some embodiments, the physical accessory 105 further comprises one or more of a gyroscope, a magnetometer, an accelerometer, a microphone, a camera, other suitable sensor, an RFID tag, a light source, a power source, a processor, a memory, a speaker, a vibration device, one or more motors, one or more batteries, one or more power sources, or other suitable component(s).

In some embodiments, one or more of a gyroscope, a magnetometer, an accelerometer, a microphone, a camera, other suitable sensor, an RFID tag, a light source, a power source, a processor, a memory, a speaker, a vibration device, one or more motors, or other suitable component(s) are included in a package of core components configured to be inserted and removed from the physical accessory 105 as a single unit. For example, if a package of core components comprising sensors, a processor, a memory and/or a communication module is removed from the physical accessory 105, the physical accessory 105 is optionally inoperable in the context of the virtual reality environment and/or unable to be controlled via the computer 107. But, if the package of sensors, a processor, a memory and/or a communication module is inserted into the physical accessory 105, the physical accessory 105 is capable of being activated and usable in the context of the virtual reality environment and/or controlled via the computer 107. A package of core components such as a package of sensors, a processor, a memory and/or a communication module makes it possible to plug and play core control, communication, sensing and/or power source components into and out of a "dumb" physical accessory 105 to make the "dumb" action figure usable in the context of the virtual reality and/or to be controlled via the computer 107 without the need to manufacture the physical accessory 105 having each and every component necessary for interaction with the computer 107, or to be usable in the context of the virtual reality environment, as discussed herein. As such, in some embodiments, one or more physical accessories 105 are configured to be communicatively coupled with a core 103.

In some embodiments, a package of core components such as a core 103 is configured to be usable with physical accessories 105 and/or action figure 101 that are of a same or a different type. For example, if a first physical accessory 105 is a car controllable by way of the computer 107, and a second physical accessory 105 is a plane usable in the context of the virtual reality environment, a package of core components is configured to bring the car and the plane to life so to speak, when added to, inserted therein or attached thereto, such that the car is capable of being controlled by the computer 107 or the plane is capable of being used in the context of the virtual reality environment.

Sensor data is recorded and communicated to the computer 107 for processing. For example, orientation and movement data collected by the various sensors is usable by the computer 107 to generate a virtual version of the physical accessory 105 that is oriented in a manner that corresponds to orientation of the physical accessory 105 in the real world.

In some embodiments, the physical accessory 105 is a shield, a staff, an ax, a cloak, armor, clothing, a tool, a gun, another weapon, a vehicle, an animal, another action figure 101, or another suitable object that is capable of being used and communicatively coupled with an action figure 101. In some embodiments, physical accessory 105 is a game card configured to cause one or more of the action figure 101, the virtual version of the action figure, or an event or status in the context of the virtual reality environment to be affected by the presence of the game card within a predetermined proximity of the action figure 101, the computer 107 or another physical accessory 105.

In some embodiments, the physical accessory 105 is inactive in a context of a game run by the computer 107 until the physical accessory 105 is communicatively coupled with the action figure 101 and/or the core 103. In some embodiments, the physical accessory 105 is communicatively coupled with the action figure 101 and/or core 103 by a physical connection. In some embodiments, the physical connection is direct. In other embodiments, the physical connection is indirect. In some embodiments, the physical accessory 105 is communicatively coupled with the action figure 101 and/or core 103 by a wireless connection.

In some embodiments, a point of attachment or contact position is detected by one or more of the action figure 101, the core 103 or the physical accessory 105. A processor of the action figure 101 or the core 103 is configured to cause the point of attachment or contact position is reported to the computer 107. In some embodiments, a function or behavior of the physical accessory 105 is based on the point of attachment or contact position. For example, in a context of a game, a function or behavior of a sword might be different if attached to the action figure 101 in the left hand compared to the right hand. In some embodiments, the function or behavior of the physical accessory 105 is free from being associated with the point of attachment or the contact position. In some embodiments, the function or behavior describes a power level or strength level of the physical accessory 105.

In some embodiments, one or more of the action figure 101 or the core 103 is configured to supply power to a physical accessory 105 that is communicatively coupled with the action figure 101. In some embodiments, one or more of the action figure 101 or the core 103 is configured to obtain information about a physical accessory 105 that is communicatively coupled with the action figure 101 and/or the core 103. In some embodiments, the a processor of action figure 101 and/or core 103 causes the information about the physical accessory 105 to be stored in the memory of the action figure 101 and/or the core 103. In some embodiments, the processor of the action figure 101 and/or the processor of the core 103 is configured to cause the obtained information about the physical accessory 105 to be communicated to the computer 107. In some embodiments, the action figure 101 is configured to control the physical accessory 105 that is communicatively coupled with the action figure 101. In some embodiments, the core 103 is configured to control the physical accessory 105 that is communicatively coupled with the action figure 101 and/or the core 103. For example, if the physical accessory 105 is a gun, once communicatively coupled with the action figure 101, a user is able to control a virtual representation of the gun in the context of the game using the action figure 101. In some embodiments, if the physical accessory 105 is a gun, once communicatively coupled with the action figure 101 and/or the core 103, a user is able to control a virtual representation of the gun in the context of the game using one or more user input sensors of the core 103.

In some embodiments, the processor of one of more of the action figure 101, the core 103 or the computer 107 is configured to determine an order by which two or more physical accessories 105 are communicatively coupled with the action figure 101. In some embodiments, two or more physical accessories 105 are coupled with the action figure 101 and/or core 103 through a bus. In some embodiments, multiple physical accessories 105 are capable of being chained together with one or more of the physical accessories 105 being connected to the action figure 101 and/or core 103. By running a serial bus, for example, across all of the connected physical accessories 105, it is possible to determine the identities and order of connection of the multiple physical accessories 105. This is useful, for example, in a situation in which the action figure 101 or core 103 is communicatively coupled to a physical accessory 105 that is a gun and another physical accessory 105 that is a vehicle or jet pack. Using the order of coupling, the computer 107 causes virtual versions of the action figure 101 and the physical accessories 105, and optionally the core 103, to appear in an orientation in the virtual reality environment that corresponds to the order by which the action figure 101, the physical accessories 105 and/or the core 103 were coupled in the real world.

In some embodiments, two or more action figures 101 are communicatively coupled with one another. In some embodiments, two action figures 101 are directly coupled with one another. In other embodiments, two action figures 101 are indirectly coupled by way of one or more physical accessories 105 or cores 103. One or more of the coupled action figures 101, the core 103 or the physical accessory 105 is configured to report the communicative coupling between the two or more action figures 101 to the computer 107. This is useful, for example, in situations where action figures 101 are capable of joining forces in the context of the game. In some embodiments, one or more cores 103 are communicatively coupled with one another and/or one or more action figures 101.

In some embodiments, one or more of the action figure 101, the core 103 or the physical accessories 105 are encoded with a unique identification code. The unique identification code is a globally unique identifier that is assigned during a manufacturing process of the action figure 101, the core 103 and/or the physical accessory 105. In some embodiments, the identification code is an encrypted identifier that is changed on a predetermined schedule to prevent counterfeiting of action figure 101, the core 103 and/or physical accessories 105. In some embodiments, the unique identifier is locally encrypted or cloud encrypted. In some embodiments, the unique identifier is encrypted by way of a 128-bit encryption. In some embodiments, the unique identifier is encrypted by way of a 256-bit encryption. In some embodiments, the unique identifier is encrypted by way some other suitable form of encryption or encryption technique.

In some embodiments, based on the unique identifier, the processor of the core 103 is configured to determine an identity of the action figure 101 to which the core 103 is added. Additionally, based on the unique identifier, the processor of the core 103 is configured to determine a type of the action figure 101 and a status or form of the action figure 101. For example, if the action figure 101 is configured to change from one form to another, such as from a car to a robot, the processor of the core 103 is configured to determine the form of the action figure 101, and to communicate the form of the action figure 101 to the computer 107. In response to the communication from the core 103 regarding the status or form of the action figure 101, the computer 107 is configured to cause the virtual version of the action figure 101 to change status or form in the context of the virtual reality.

In some embodiments, a behavior of the video game is affected by the physical presence and configuration of the action figure 101, the core 103 and/or the physical accessory 105. For example, if an action figure 101 is holding a physical accessory 105 that is a sword, and the core 103 is added to the action figure 101, then a virtual version of that sword will be displayed in the virtual reality environment. In some embodiments, occurrences in the game optionally affect one or more characteristics of the action figure 101, the core 103 or the physical accessory 105. For example, if extra power is won for the sword accessory during game play, then the computer 107 is configured to cause one or more of the action figure 101, the core 103 or the physical accessory 105 to reflect the increased power. In some embodiments, the physical accessory 105, the action figure 101 or the core 103 comprises one or more light sources, such as a light emitting diode (LED), that are configured to be actuated in response to an instruction received from the computer 107 based on an occurrence in the video game. For example, a light source of the physical accessory 105 is capable of being turned-on if and when the sword accessory has extra power.

In another example, a weapon-type physical accessory 105, such as a gun, is capable of indicating whether the gun is loaded with ammunition by actuating one or more light sources included in the physical accessory 105, and then turning off the light source if the gun is out of ammunition, or reducing a quantity of activated light sources based on an amount of remaining ammunition. Similarly, in some embodiments, the action figure 101 or core 103 optionally includes one or more light sources that are used in conjunction with the video game run by the computer 107 to indicate various statuses of one or more of the action figure 101, the core 103 or one or more physical accessories 105. For example, a light source of the action figure 101 and/or the core 103 is optionally actuated to indicate that the action figure 101 is alive in the context of the game. Then, if the action figure 101 is losing power or life in the game, the light source of the action figure 101 or the core 103 is optionally caused to dim or blink by the processor of the action figure 101 or the core 103 based on data received from the computer 107. For example, as an action figure 101 is dying in the context of the game, the light source of the action figure 101 or the core 103 optionally blinks to represent a slowing heart beat. Alternatively, to indicate a power-up status or an attack mode status, one or more light sources of the action figure 101 or the core 103 is caused to light up. In some embodiments, the processor of one or more of the action figure 101, the core 103 or the physical accessory 105 are configured to cause the light sources of the action figure 101, the core 103, and/or the physical accessory 105 to light up indicate a status, behavior or occurrence in the context of the game.

In some embodiments, to indicate a status, behavior or occurrence, the processor of one or more of the core 103 or the action figure 101 is configured to cause one or more of a speaker of the core 103, the action figure 101, or the physical accessory 105 to output an audible sound that is associated with a game mode or condition of the virtual version of the action figure 101, the core 103 or the physical accessory 105 in the context of the game. For example, if the virtual version of the action figure 101 is caused to be in a "super attack" mode in the context of the game, the processor of one or more of the action figure 101, the core 103 or the physical accessory causes the speaker of at least one of the action figure 101, the core 103 or the physical accessory 105 to output an audible sound that sounds like a scream of the term "super attack!" As another example, if the virtual version of the action figure 101 is caused to be in a reduced level of health, power, or is in trouble in the context of the game, the processor of one or more of the action figure 101, the core 103 or the physical accessory causes the speaker of at least one of the action figure 101, the core 103 or the physical accessory 105 to output an audible sound that sounds like a scream of the term "heal me" or "help me!"

In some embodiments, a sound output by the speaker of the action figure 101, the core 103 or the physical accessory 105 is an announcement of a level reached, a location or place in the virtual reality at which the virtual version of the action figure 101 is positioned, an action that should be made, an instruction, a place that an item may be found, or other suitable announcement, instruction, or direction. For example, the processor of the core 103 is optionally configured to cause the speaker of the core 103 to output a sound that announces "get jet pack," the processor of the core 103 also causes the physical accessory 105 (e.g., the jet pack) to output a sound that announces "over here" so that the user is able to recognize a location of the physical accessory 105, and processor of the action figure 101 and/or the core 103 causes the speaker of the action figure 101 to output a sound that screams "gimme that jet pack" to prompt the user to find and attach the jet pack physical accessory 105 to the core 103, the action figure 101 and/or another physical accessory 105. In some embodiments, the processor of one or more of the action figure 101, the core 103 or the physical accessory 105 is configured to cause a speaker of one or more of the action figure 101, the core 103 or the physical accessory 105 to output a sound based on an occurrence in the real world. For example, if a physical accessory 105 such as the example jet pack is attached to the action figure 101, the one or more speakers are caused to output a sound that announces an indication that the attachment is complete such as "let's go hot shot!"

In some embodiments, the processor of the core 103, the physical accessory 105 and/or the action figure 101 is configured to receive an instruction from the computer 107 that prompts a user to one or more of add the core 103 to the action figure 101, add one or more physical accessories 105 to the core 103, the action figure 101 and/or one or more other physical accessories 105 based on an occurrence in the game. For example, if a virtual version of the action figure 101 is at a point in the virtual reality that the virtual version of the action figure 101 has to choose between jumping off a mountain or climbing down the mountain, the processor of the action figure 101 or the core 103 is configured to cause a prompt to suggest that the user attach a physical accessory 105 that corresponds to a selected option for proceeding down the mountain. For example, if one physical accessory 105 is a jet pack and another physical accessory 105 is a grappling hook, the processor of the core 103 or the action figure 101 is configured to cause a prompt recognizable by the user to add the jet pack to the core 103 or the action figure 101 to jump off the mountain, or to add the grappling hook to the core 103 or the action figure 101 to climb down the mountain. In some embodiments, the processor of the core 103 or the action figure 101 is configured to facilitate an option to ignore the prompt and to use a controller other than the system 100 to control the virtual version of the action figure 101. In some embodiments, one or more of the computer 107, the processor of the core 103 or the action figure 101 is configured to prompt a user to return to using the controller other than the action figure 101 based on a situation in the virtual reality.

In some embodiments, a handoff between control of the virtual version of the action figure 101 using a controller other than the action figure 101 and/or the core 103 and control using the action figure 101 and/or the core 103 is based on one or more of an actuation of switch included as a component of the core 103, an actuation of a switch included as a component of the action figure 101, an addition or removal of a physical accessory 105 to or from the action figure 101, the core 103 or other physical accessory 105, or an automated handoff based on a communication between the computer 107 and one or more of the processor of the action figure 101, the core 103 or the physical accessory 105.

In some embodiments, one or more of the action figure 101, the core 103 or the physical accessory 105 comprise a vibration device that is capable of providing a haptic response based on an instruction received from the computer 107. For example, if an action figure 101 is "hit" in the context of the video game, the action figure 1010 or the core 103 optionally vibrates. Similarly, if the virtual version of the physical accessor 105 is "hit," the action figure 101, the core 103 or the physical accessory 105 vibrates.

In some embodiments, one or more of the processor of the action figure 101, the processor of the core 103, the processor of the physical accessory 105 or the computer 107 is configured to cause data to be collected regarding a duration of use of the action figure 101, the core 103, the accessory 105 and/or the computer 107. In some embodiments, the duration of use is based on an amount of time that one or more of the action figure 101 or the core 103 is communicatively coupled with the computer 107 and interacting with the video game. In some embodiments, the duration of use is based on an amount of time that the action figure 101 and the core 103 are communicatively coupled with one another. In some embodiments, the duration of use is based on an amount of time that the action figure 101 and the core 103 are communicatively coupled with one another and the amount of time that the combination of the action figure 101 and the core 103 are in communicatively coupled with the computer 107 and interacting with the video game.

In some embodiments, the duration of use is based on how often, or in what ways, an action figure 101, a core 103 and/or a physical accessory 105 are paired, moved, played with, manipulated, or some other suitable indicator. In some embodiments, one or more of the processor of the action figure 101, the processor of the core 103 or the processor of the physical accessory 105 is configured to cause a quantity of attachments of a physical accessory 105 to an action figure 101 or a core 103 to be recorded. In some embodiments, one or more of the processor of the action figure 101, the processor of the core 103 or the processor of the physical accessory 105 is configured to cause a location of use of the action figure 101, the core 103 or the physical accessory 105 to be recorded. The recorded usage data is capable of being analyzed by the computer 107 or a gaming management platform associated with the software application implemented by the computer 107 and/or a service provider to provide insight into user behavior and/or interest in the action figure 101, core 103, various physical accessories 105, video games run by computer 107, or other suitable discoverable metrics.

In some embodiments, the action figure 101, core 103 and/or the physical accessory 105 comprises one or more of a temperature sensor, a heart rate sensor, or a skin moisture content sensor to monitor vital signs of a user. In some embodiments, the processor of the action figure 101, the core 103 or the physical accessory 105 is configured cause vital signs of a user to be measured to determine if a user is happy, sad, anxious, scared, or excited about a game, the action figure 101, moments in the game, a type of core 103, a type of physical accessory 109, or other suitable emotion with respect to the game, action figure 101, moments in the game, type of core 103, type of physical accessory, or other facet associated with the software application implemented by the computer 107. In some embodiments, because one or more of the processor of the action figure 101, the core 103 or the physical accessory 105 is configured to facilitate monitoring the vital signs of a user. In some embodiments such monitoring is performed by way of the communicative coupling with the computer 107. The communicative coupling of the action figure 101, core 103 or physical accessory 105 makes it possible for monitoring vital signs from a remote location. As such, one or more of the action figure 101, core 103 or physical accessory 105 makes it possible to passively check on a health status of a user from a location remote from the action figure 101, core 103 and/or physical accessory 105.

In some embodiments, the processor of the action figure 101, the processor of the core 103, the processor of the physical accessory 105, or the computer 107 is configured to process the data collected by the action figure 101, core 103, physical accessory 105 and/or computer 107 to map a set of tendencies, interests, habits, other suitable determinable pattern, to predict a behavior of a user in the real world or in the context of a game implemented by the computer 107, or a use of an action figure 101, core 103, physical accessory 105 and/or computer 107. Based on the mapped behavior or prediction, one or more of the processor of the action figure 101, the processor of the core 103, the processor of the physical accessory 105, the computer 107, the gaming management platform associated with the software application implemented by the computer 107 is configured to cause an instruction or a suggestion to be output by way of the action figure 101, the core 103, the physical accessory 105 and/or the computer 107 to prompt a user to do something, buy something, go some place, move or react in the context of the virtual reality (e.g., jump, duck, dip, dive, dodge, fly, shoot, use sword, retreat), change a difficulty level of the game being executed by the computer 107, find friends to meet regarding the video game, trade physical accessories 105, action figures 101 or cores 103, try to find more powerful action figures 101, cores 103 physical accessories 105, to join forces with a group of other users and team up in the context of the game or the real world, or some other suitable instruction, suggestion or recommendation.

Figure 2:
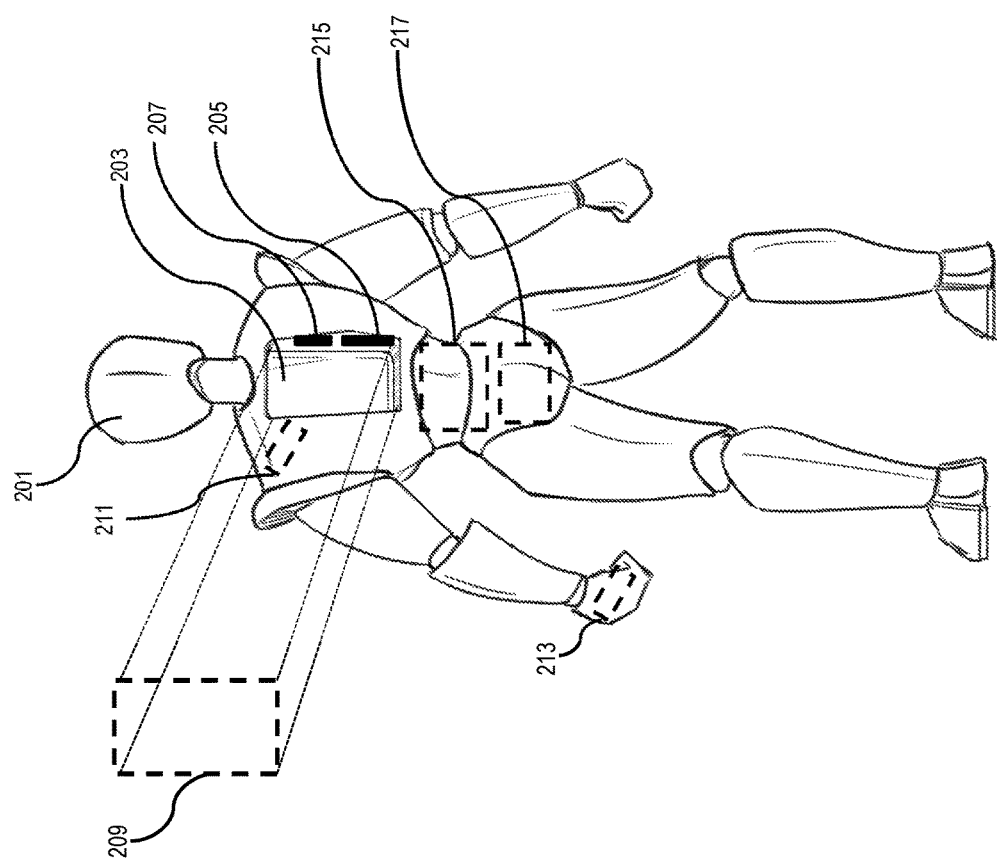
FIG. 2 is a perspective view of an action figure, in accordance with some embodiments.

FIG. 2 is a perspective view of an action figure 201, in accordance with some embodiments. Action figure 201 is configured to be included in system 100 (FIG. 1) as action figure 101 (FIG. 1). Action figure 201 comprises a core reception portion 203. Core reception portion 203 is configured to receive core 103 (FIG. 1) if the core 103 is added to action figure 201. In some embodiments, core 103 is configured to mate with the core reception portion 203 if the core 103 is added to action figure 201.

In some embodiments, action figure 201 comprises one or more contact terminals 205 to facilitate a communicative coupling between the core 103 and action figure 201. In some embodiments, action figure 201 and core 103 are configured to communicate wirelessly. In some embodiments, the action figure 201 is configured to communicate wirelessly with a core 103 and includes one or more contact terminals 205 such that the action figure 201 is capable of being communicatively coupled with multiple cores 103 or with a core 103 that is incapable of being wirelessly communicatively coupled with action figure 201.

Action figure 201 comprises a locking device 207 configured to interact with core 103 such that if the core 103 is added to action figure 201 by attaching the core 103 to action figure 201, the core 103 is locked in position. In some embodiments, locking device 207 is a locking mechanism reception port configured to receive a male locking mechanism included as a part of the core 103. In some embodiments, the locking device 207 comprises a magnet configured to hold the core 103 in position. In some embodiments, the locking device 207 comprises a latch configured to mate with a latch reception port of the core 103. In some embodiments, action figure 201 is free from including a locking device 207.

Action figure 201 optionally comprises a cover portion 209 configured to hide and/or hold the core 103 within the action figure 201. In some embodiments, an interior space defined by the core reception portion 203 and the cover portion 209 is shaped like core 103. For example, if core 103 is a sphere or a cube, the interior space is shaped like, and configured to accommodate, a sphere or a cube. Cover portion 109 is configured to be attached to a surface of action figure 201 by way of a hinge, clasp, or other suitable fastener.

Action figure 201 optionally comprises one or more body lights 211. Body lights 211 are configured to be turned on or off. In some embodiments, action figure 201 comprises one or more body sensors 213. In some embodiments, action figure 201 comprises a body power supply 215. In some embodiments, action figure 101 comprises a body memory 217 comprising identification information associated with the action figure 201. The identification information is capable of being read by a processor of core 103. In some embodiments, the processor of core 103 is configured to be communicatively coupled with the body memory 215 of action figure 201 if the core 103 is added to the action figure 201.

In some embodiments, the action figure 201 is configured to use power supplied from the body power supply 215, alone. In some embodiments, the action figure 201 is configured to use power supplied by the power supply of the core 103, alone. In some embodiments, the action figure 201 is configured to use a combination of the body power supply 215 and the power supply of the core 103. In some embodiments, the power supply of the core 103 is electrically coupled with the action figure 101 by way of an inductive coupling.

Figure 3:
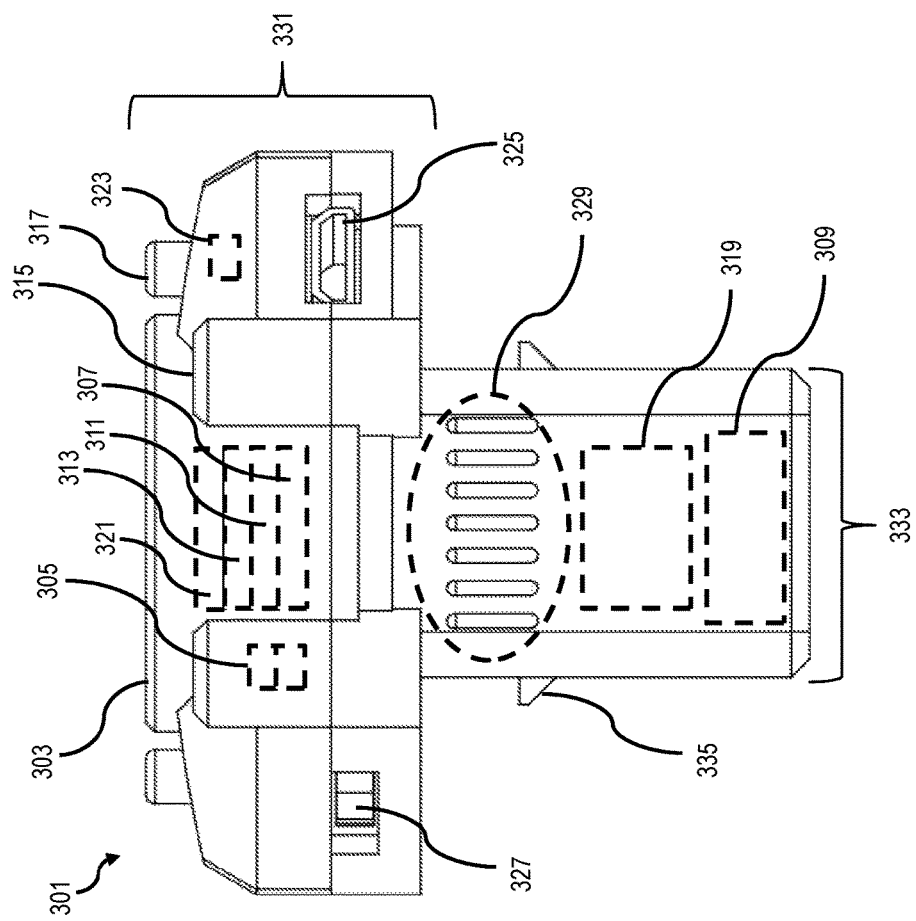
FIG. 3 is a side view of a core, in accordance with one or more embodiments.

FIG. 3 is a side view of a core 301, in accordance with one or more embodiments. Core 301 is configured to be included in system 100 (FIG. 1) as core 103 (FIG. 1). Core 301 comprises a housing 303, one or more sensors 305 (collectively referred to as "sensor 305" where appropriate), a transceiver 307, a power supply 309, a memory 311, and a processor 313. In some embodiments, core 301 optionally comprises at least one of one or more light elements 315 on an exterior of the housing 303, one or more input sensors 317 on an exterior of the housing 303, one or more motors 319, one or more speakers 321, one or more microphones 323, one or more data input ports 325, or one or more switches 327. In some embodiments, at least one of the one or more sensors 305, the transceiver 307, the power supply 309, the memory 311, the processor 313, the one or more light elements 315, the one or more input sensors 317, the one or more motors 319, the one or more speakers 321, the one or more microphones 323, the one or more data input ports 325, or the one or more switches are inside the housing 303.

Core 301 comprises a contact terminal 329 exposed from the housing 303. The contact terminal 329 is electrically coupled with the processor 313 and configured to contact a contact terminal included as a component of the action figure 101 (FIG. 1) such as contact terminal 205 (FIG. 2) if the core 301 is added to the action figure 101. The electrical coupling between the processor 313 and the action figure 101 is by way of a contact between the contact terminal 329 and the contact terminal of the action figure 101. In some embodiments, the contact terminal 329 is fixed to the housing 303. In some embodiments, the contact terminal 329 is fixed to a side surface of the housing 303. In some embodiments, contact terminal 329 is configured to extend form the core 301 by way of a wire or some other suitable structural feature.

Processor 313 is communicatively coupled with the one or more sensors 305, the transceiver 307, the power supply 309, and the memory 311. If the core 301 includes one or more light elements 315 the processor 313 is communicatively coupled with the one or more light elements 315. If the core 301 includes one or more input sensors 317, the processor 313 is communicatively coupled with the one or more input sensors 317. If the core 301 includes one or more motors 319, the processor 313 is communicatively coupled with the one or more motors 319.

Memory 311 comprises computer program code for one or more programs and is configured to be accessed by the processor 313. Processor 313 is configured to execute an instruction stored in the memory 311 to cause the processor 313 to be communicatively coupled with a computer such as computer 107 (FIG. 1). The processor 313 is configured to be communicatively coupled with the computer by way of the transceiver 307 based, at least in part, on a determination that the core 301 is added to the action figure 101. In some embodiments, the processor 313 is configured to determine the core 301 is added to the action figure 101 if at least a portion of the housing 303 is added to the action figure 101. In some embodiments, the processor 313 is configured to determine the housing 303 is added to the action figure 101 based, at least in part, on an electrical coupling between the processor 313 and the action figure 101.

In some embodiments, the housing 303 comprises a head portion 331 and a shaft portion 333. The shaft portion 333 is configured to be inserted into the action figure 101. In some embodiments, the head portion 331 is configured to remain outside the action figure 101 if the shaft portion 333 is inserted into the action figure 101.

In some embodiments, the electrical coupling between the processor 313 and the action figure 101 is an inductive coupling. In some embodiments, if the processor 313 is configured to determine that the core 301 is added to the action figure 101 based on an inductive coupling, the core 301 is free from having an external electrical connector such as a contact terminal on a side surface of the housing 303 or an external extending wire.

In some embodiments, the processor 313 is configured to determine the core 301 is added to the action figure 101 based, at least in part, on an input received by way of at least one of the input sensors 317. In some embodiments, the processor 313 is configured to identify the action figure 101 based, at least in part, on the input received by way of the at least one input sensor 317. In some embodiments, the processor 313 is configured to determine the core 301 is added to the action figure 101 based, at least in part, on an input received by way of at least one of the switches 327. In some embodiments, the processor 313 is configured to identify the action figure 101 based, at least in part, on the input received by way of at least one of the switches 327.

Core 301 includes a locking mechanism 335. In some embodiments, core 301 is free from including locking mechanism 335. Locking mechanism 335 comprises one or more of a latch, a clasp, a magnet, or some other suitable fastener configured to interact with a locking device of the action figure 101 (FIG. 1) such as locking device 207 of action figure 201 (FIG. 2).

In some embodiments, the housing 303 is shaped like a cube, a sphere, a pyramid, a different polygonal shape, a miniature action figure compared to the action figure 101, or some other suitable shape.

Based, at least in part, on the determination that the core 301 is added to the action figure 101, the processor 313 is configured to cause the computer 107 to generate the virtual representation of the action figure 101 in a virtual reality viewable by way of a display associated with the computer 107. In some embodiments, the processor 313 is configured to cause the computer 107 to orient the virtual representation of the action figure 101 in the virtual reality based on data collected by at least one of the one or more sensors 305. In some embodiments, the one or more sensors 305 are included in the core 103 as a sensor package comprising one or more of an accelerometer, a gyroscope, an altimeter, or some other suitable type of sensor.

If the core 301 includes light elements 315 or the action figure 101 includes body lights such as body lights 211 (FIG. 2), the processor 1313 is configured to cause at least one of the one or more light elements 315 or the one or more body lights to be on or off based, at least in part, on an instruction received from the computer associated with the software application.

In some embodiments, if the core 301 includes one or more user input sensors 317, the one or more user input sensors 317 are configured to receive a user input associated with the software application implemented by the computer. The processor 313 is configured to cause a communication to be sent to the computer associated with the software application based on an input received from a user by way of at least one of the one or more user input sensors. For example, if a user is playing a video game, the one or more input sensors 317 are usable to interact with the video game. In some embodiments, at least one of the one or more user input sensors 317 comprises a depressible button on an exterior of the housing. In some embodiments, the one or more user input sensors 317 comprises a microphone, a light sensor, a touch-panel display, a motion sensor, a temperature sensor, an optical sensor, or some other suitable type of sensor.

If the core 301 includes the motor 319, the processor 313 is configured to cause the motor 319 to move based, at least in part, on a communication received from the computer associated with the software application. For example, if the core 301 is added to the action figure 101, the motor 319 is configured to cause the core 301 to vibrate the action figure 101 based on an instruction received from the computer. In some embodiments, the system 100 makes it possible for the user to receive feedback by way of the real-world physical object based on events that occur in the virtual reality environment. In some embodiments, the processor 313 is configured to actuate the motor 319 to cause a haptic response to an event that occurs in the virtual reality output by the display associated with the computer.

Figure 4:
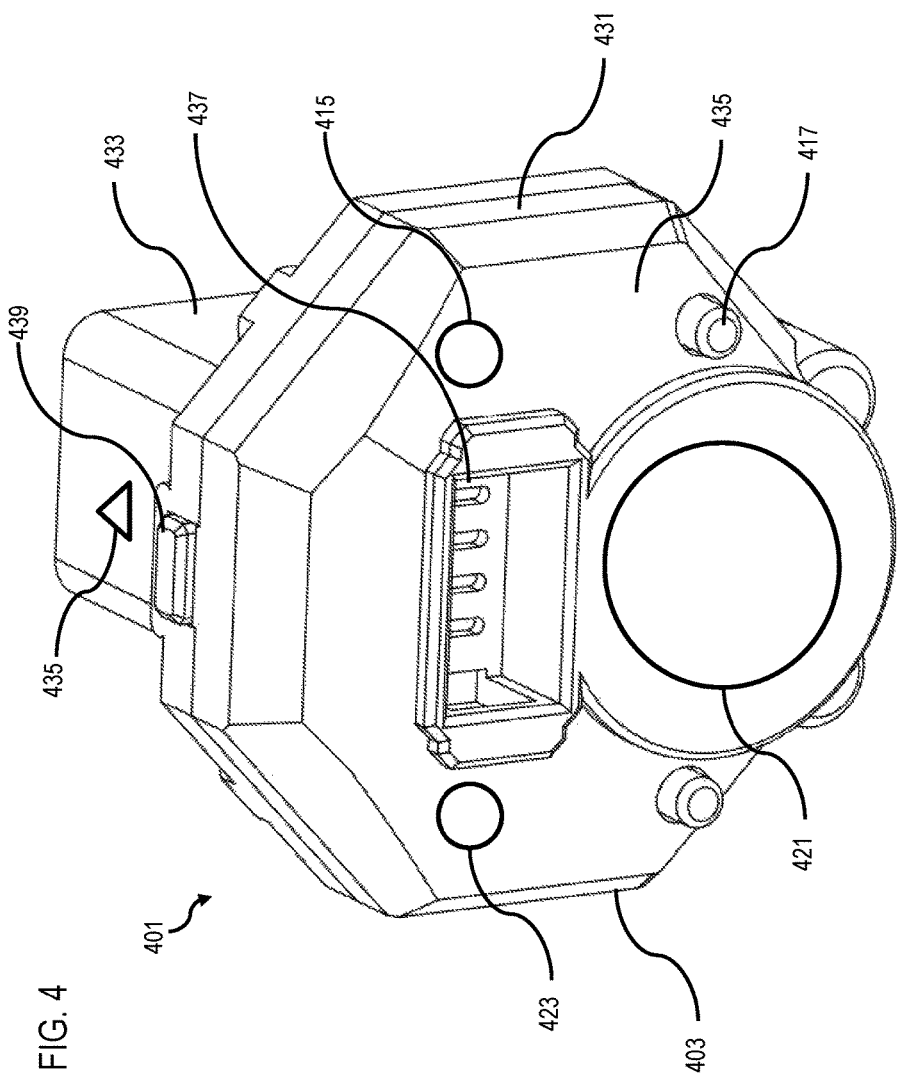
FIG. 4 is a perspective view of a core, in accordance with one or more embodiments.

FIG. 4 is a perspective view of a core 401, in accordance with one or more embodiments. Core 401 comprises one or more of the features discussed with respect to core 301 (FIG. 3). For ease of discussion, the reference numerals discussed with respect to core 401 are increased by 100 compared to those discussed with respect to core 301. Core 401 is configured to be included in system 100 (FIG. 1) as core 103 (FIG. 1). The head portion 431 of core 401 has a top surface 435. Core 401 includes one or more lighting elements 415 on the top surface 435 of the head portion 431. In some embodiments, the lighting elements 415 are positioned on one or more other surfaces of the head portion 431 or the shaft portion 433 of the core 401. Core 401 also includes one or more user input sensors 417 on the top surface 435 of the head portion 431. In some embodiments, the user input sensors 417 are positioned on one or more other surfaces of the head portion 431 or the shaft portion 433 of the core 401. Core 401 includes one or more speakers 421 on or near the top surface 435 of the head portion 431. In some embodiments, the one or more speakers 421 are positioned on one or more other surfaces of the head portion 431 or the shaft portion 433 of the core 401. Core 401 includes one or more microphones 423 on the top surface 435 of the head portion 431. In some embodiments, the one or more microphones 423 are positioned on one or more other surfaces of the head portion 431 or the shaft portion 433 of the core 401.

Core 401 comprises a contact terminal 437 exposed from the housing 403. The contact terminal 437 is accessible by way of the top surface 435 of the head portion 431. Contact terminal 437 is configured to be electrically coupled with a terminal included as a component of a physical accessory such as physical accessory 105b (FIG. 1). In some embodiments, the housing 403 is configured to be physically coupled with the physical accessory 105b.

In some embodiments, core 401 includes a release button 439 configured to interact with the locking mechanism 435 to release the core 401 from the action figure 101 if the core 401 is inserted into action figure 101.

Figure 5:
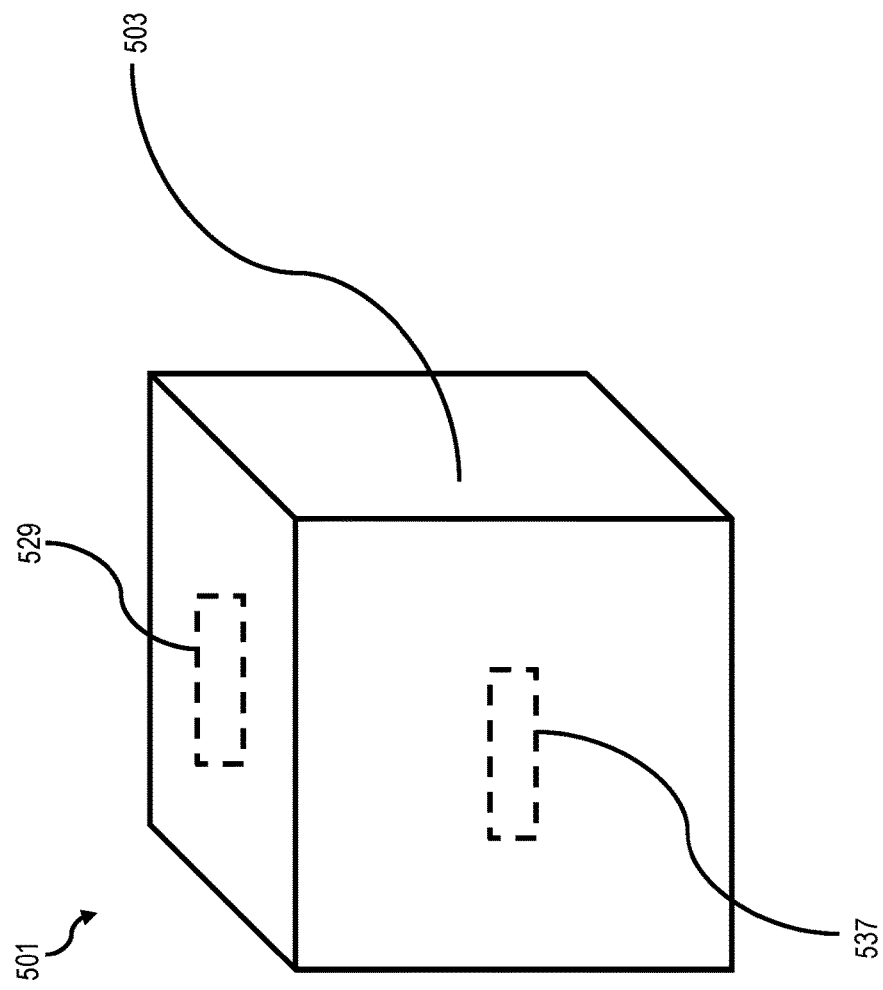
FIG. 5 is a perspective view of a cube-shaped core, in accordance with one or more embodiments.

FIG. 5 is a perspective view of a core 501, in accordance with one or more embodiments. Core 501 comprises one or more of the features discussed with respect to core 401 (FIG. 4). For ease of discussion, the reference numerals discussed with respect to core 501 are increased by 100 compared to those discussed with respect to core 401. Core 501 is configured to be included in system 100 (FIG. 1) as core 103 (FIG. 1).

Housing 503 of core 501 is cube-shaped and free from having any external elements such as a contact terminal. The processor 513 (not shown) and the power supply 509 (not shown), for example, are configured to be communicatively coupled with the action figure 101 (FIG. 1) by way of an inductive coupling.

In some embodiments, core 501 optionally comprises one or more contact terminals 529 and/or one or more contact terminals 537 for communicatively coupling core 501 with action figure 101 and/or a physical accessory 105 (FIG. 1).

Figure 6:
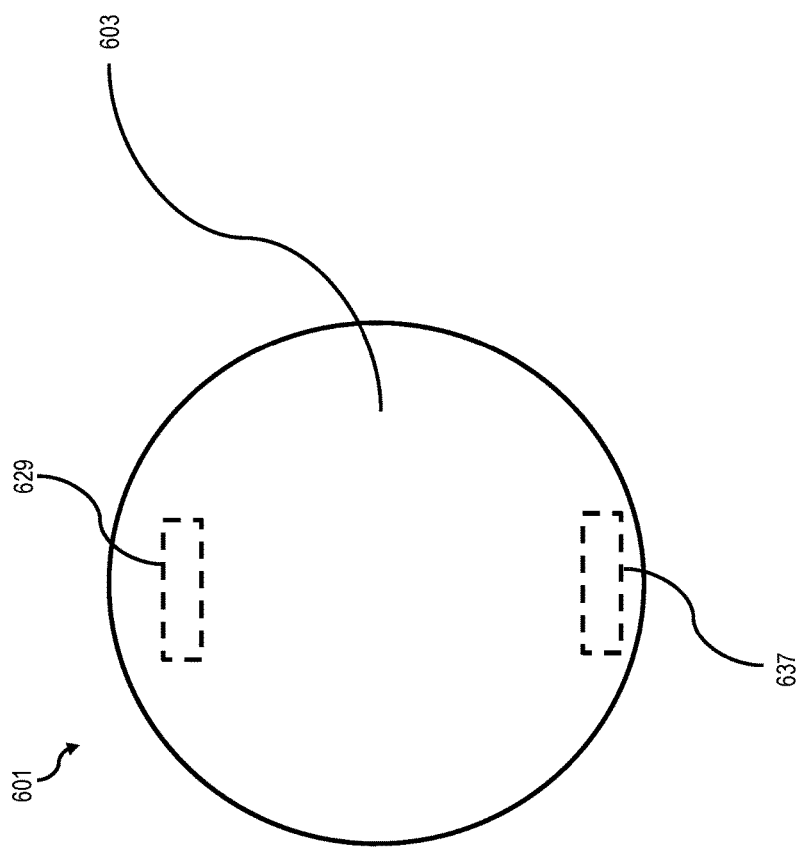
FIG. 6 is a perspective view of a spherical-shaped core, in accordance with one or more embodiments.

FIG. 6 is a perspective view of a core 601, in accordance with one or more embodiments. Core 601 comprises one or more of the features discussed with respect to core 401 (FIG. 4). For ease of discussion, the reference numerals discussed with respect to core 601 are increased by 200 compared to those discussed with respect to core 401. Core 601 is configured to be included in system 100 (FIG. 1) as core 103 (FIG. 1).

Housing 603 of core 601 is spherical and free from having any external elements such as a contact terminal. The processor 613 (not shown) and the power supply 609 (not shown), for example, are configured to be communicatively coupled with the action figure 101 (FIG. 1) by way of an inductive coupling.

In some embodiments, core 601 optionally comprises one or more contact terminals 629 and/or one or more contact terminals 637 for communicatively coupling core 601 with action figure 101 and/or a physical accessory 105 (FIG. 1).

Figure 7:
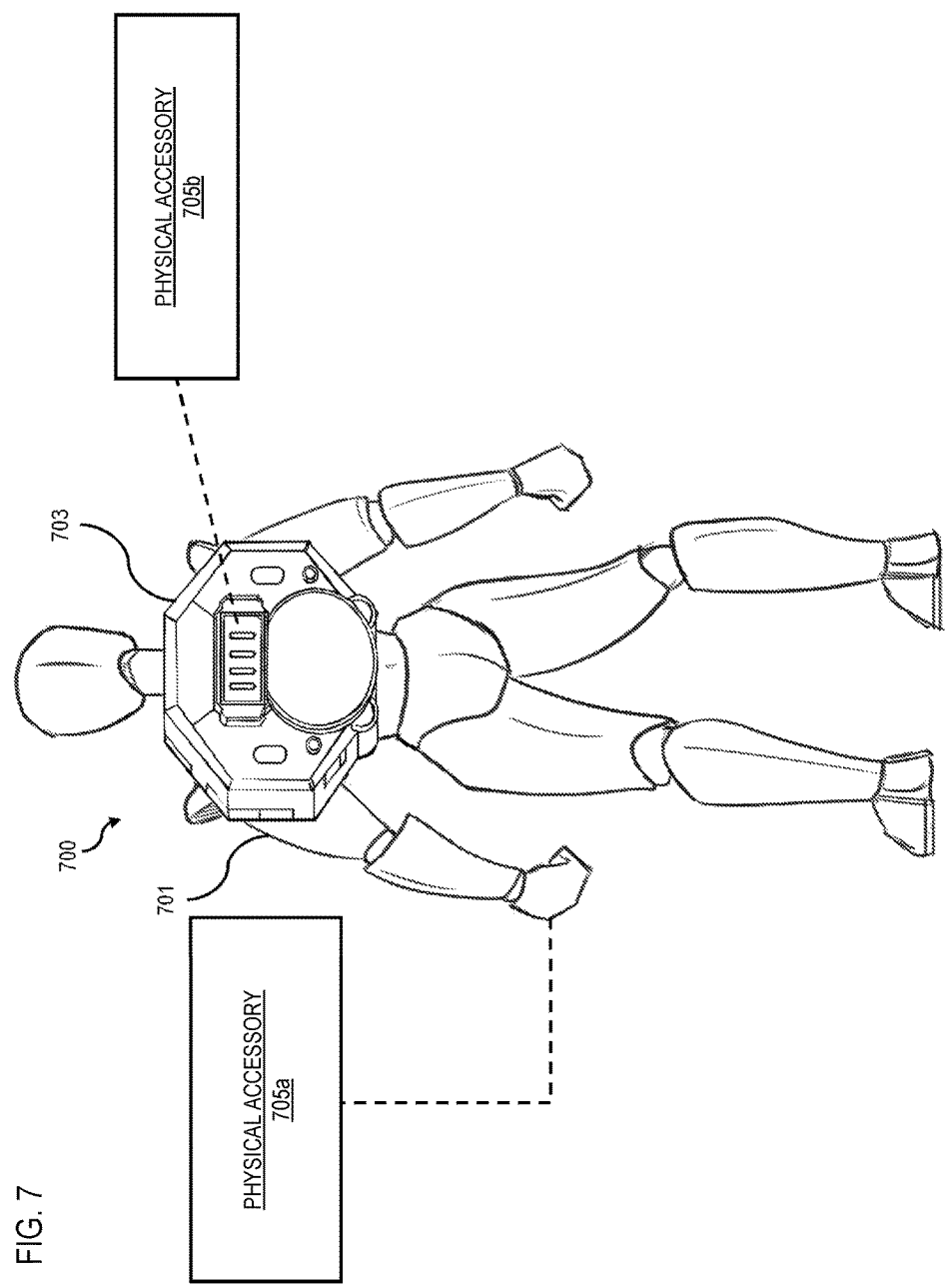
FIG. 7 is a perspective view of an assembled system, in accordance with one or more embodiments.

FIG. 7 is a perspective view of an assembled system 700, in accordance with one or more embodiments. System 700 comprises many of the features discussed with respect to system 100 (FIG. 1), with the reference numerals increased by 100. System 700 comprises action figure 701, core 703 and physical accessories 705a and 705b.

Physical accessory 705a is a real world object capable of being held by or attached to a hand or an arm of action figure 101. In some embodiments, physical accessory 705a is a weapon such as a gun or a sword, or some other suitable object that is usable in the context of the virtual reality environment. Physical accessory 705b is a real world physical object capable of being attached to the core 703 by way of a contact terminal of the core 703 similar to contact terminal 437 (FIG. 4), for example. In some embodiments, physical accessory 705b is a jet pack or other suitable attachment usable in the context of the virtual reality environment.

Figure 8:
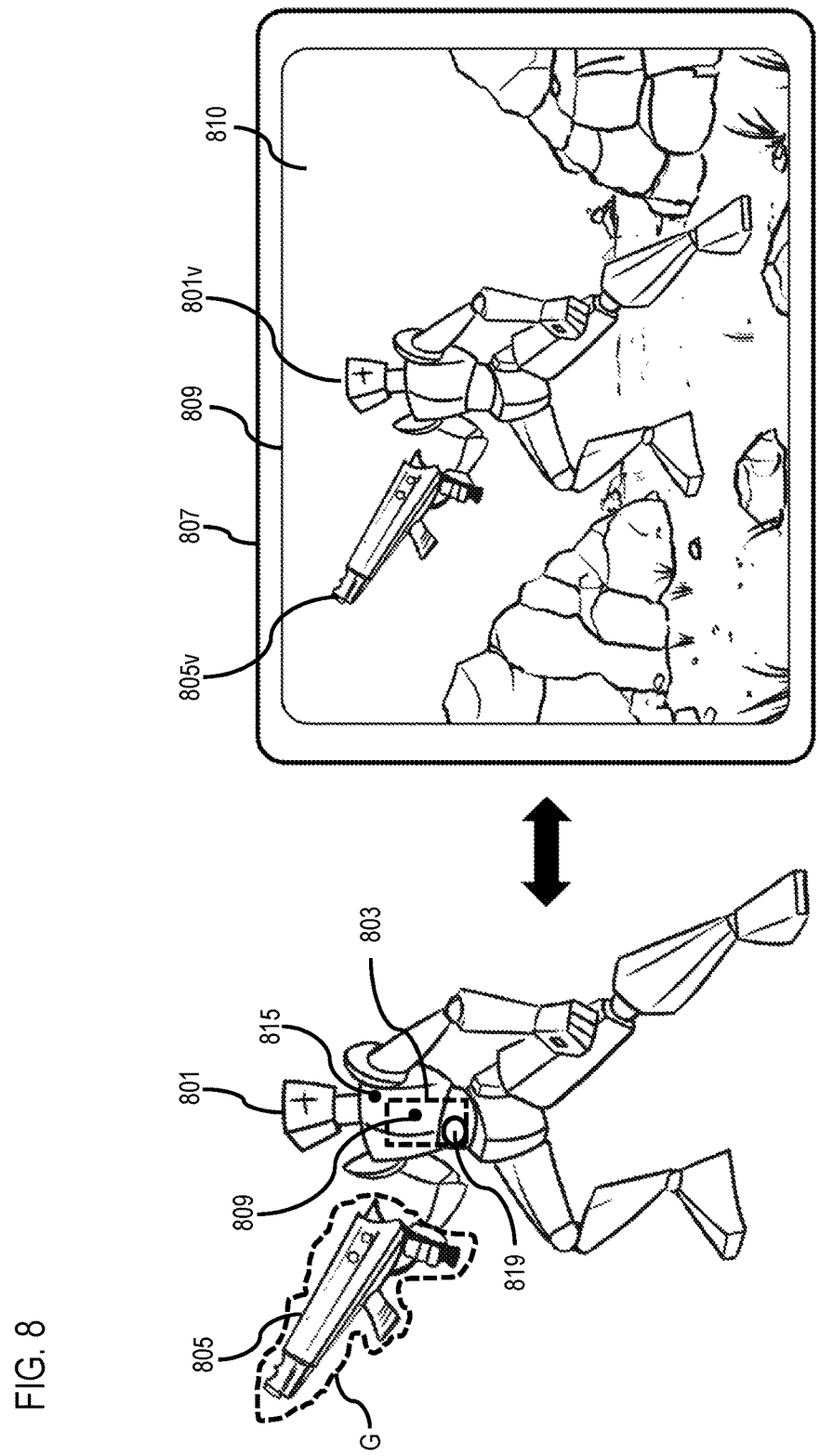
FIG. 8 is a diagram of an action figure, a core, a physical accessory, a computer, a display and a user interface, in accordance with some embodiments.

FIG. 8 is a diagram of an action figure 801, a core 803, a physical accessory 805, a computer 807, a display 809 and a user interface 810, in accordance with one or more embodiments. Action figure 801, core 803, physical accessory 805 computer 807 and display 809 are similar to the features described with respect to FIG. 1, with the reference numerals increased by 700. The action figure 801 and the computer 807 are communicatively coupled by a two-way communication via the core 803. Display 809 is configured to output user interface 810 based on an instruction generated by the computer 807.

Computer 807 is running a video game that is viewable by way of the display 809. A user interacts with the video game by way of the action figure 801, the core 803, the physical accessory 805, and/or user interface 810. The user interface 810 comprises a virtual version of the action figure 801v and a virtual version of the physical accessory 805v. In this example, the core 803 is inside the action figure 801. In some embodiments, a virtual version of the core 803 is provided in the user interface 810. For example, if core 803 is at least partially outside action figure 801, the core 803 may be viewable as a virtual version in the context of the video game.

In this example, the physical accessory 805 is held in the right hand of the action figure 801. The virtual version of the action figure 801v shown in the user interface 810 is holding the virtual version of the physical accessory 805v in the right hand. The computer 107 causes the virtual version of the physical accessory 805v to be oriented with respect to the virtual version of the action figure 801v in the user interface 810 based on sensor data received from the action figure 801, the core 803 and/or the physical accessory 805.

Based on one or more occurrences in the game run by computer 807, the computer 807 communicates commands to the action figure 801, the core 803 and/or the physical accessory 805. The commands communicated to the action figure 801, the core 803 and/or the physical accessory 805 cause the action figure 801, 803 and/or the physical accessory 805 to react in a way that reflects the occurrence in the game. For example, based on a change in status or function of the virtual version of the action figure 801v and/or the virtual version of the physical accessory 805v in the context of the game, the computer 807 communicates a command to cause the physical accessory 805 to glow G (e.g., actuating the light source of the physical accessory 805), to indicate the change in status or function of the virtual version of the action figure 801v and/or the virtual version of the physical accessory 805v. In some embodiments, the physical accessory 805 is directly communicatively coupled with the core 803.

Core 803 includes one or more of a gyroscope, a magnetometer, an accelerometer, a microphone, a camera, other suitable sensor, an RFID tag, a light source, a power source, a processor, a memory, a speaker, a vibration device, one or more motors, a temperature sensor, a heart rate sensor, a skin moisture content sensor, or other suitable component(s).

In some embodiments, core 803 and/or action figure 801 is configured to recognize three-dimensional (3D) objects and to trigger various events or state changes within the action figure 801, core 803, the computer 807 and/or physical accessory 805 based on the detection of the 3D object. For example, if the 3D object is determined to be in a predetermined proximity of a "flying" action figure 801, a user controlling the action figure 801 in the real world should pilot the action figure 801 to avoid the 3D object. If the action figure 801 "crashes" into the 3D object, then a life or power status of the action figure 801 is optionally changed. In some embodiments, the detection of a 3D object causes the action figure 801 or the core 803 to make audible sounds to perform a task related to the 3D object. In some embodiments, video sensors 813 included in one or more of the action figure 801 or the core 803 is configured to recognize 3D objects and/or video content. In some embodiments, the recognized 3D objects and/or video content causes a change in state of the action figure 801 and/or the physical accessory 805. For example, if the action figure 801 "crashes" into the 3D object, as detected by the action figure 801 or the core 803, then the action figure 801 is optionally caused to vibrate, to lose a limb or feature such as a wing, for example, to drop the physical accessory 805, or to indicate a change in state by way of some other suitable effect.

In some embodiments, the action figure 801, the physical accessory 805 and/or the core 803 is configured to superimpose a 3D augmented reality over the recognized 3D object(s) or a plane over the recognized 3D object(s). In some embodiments, the one or more of the action figure 801 or the core 803 comprises a projection device 819 usable to superimpose a 3D augmented reality onto an object. Alternatively or additionally, or more of the physical accessory 805 or the computer 807 comprise respective projection devices that are capable of individually or together with other projector devices, generate a 3D display. A 3D augmented reality is capable of enhancing a user's experience with the action figure 801, the physical accessory 805 and/or the computer 807. For example, if a user is playing a game that involves climbing a castle wall, one or more of the computer 807, the action figure 801, or the physical accessory 805 is configured to detect a piece of furniture in a room and to project a 3D augmented reality version of a castle wall onto the piece of furniture to enhance the gaming experience.

In some embodiments, the action figure 801 and/or the physical accessory 805 are configured to interact with the projected 3D augmented reality. For example, if the projection displays a falling boulder over the castle wall, then the action figure 801 is capable of being "hit" by the falling boulder in the context of the game. To determine if the action figure 801 is hit in the augmented reality, the computer 807 is configured to process orientation and movement data provided by the sensors of the action figure 801, the core 803, and/or the physical accessory 805, and correlate the sensor data with information about the game being run by the computer 807. In some embodiments, the projected 3D augmented reality includes a character in the context of the game with which action figure 801 is capable of interacting in the real world and/or in the context of the game.

Figure 9:
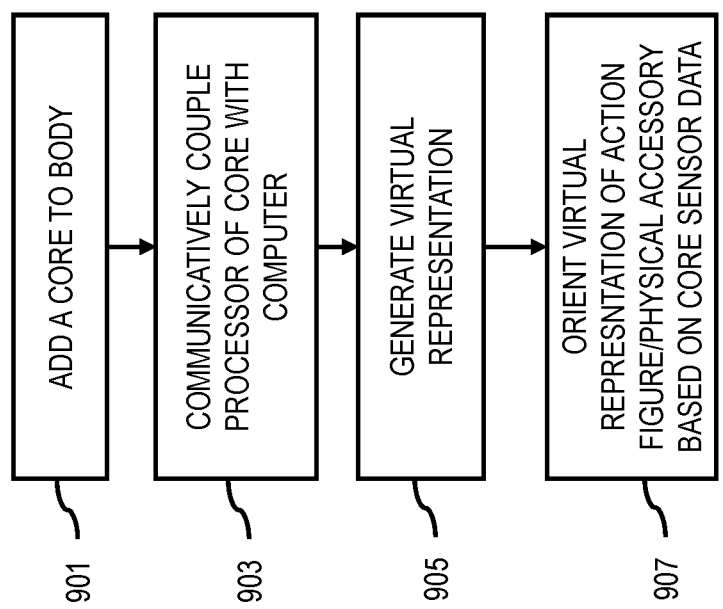
FIG. 9 is a flowchart of a method of facilitating interactions between an action figure, a core such as core, a physical accessory such as physical accessory, and a virtual reality environment such as a video game run by a computer, in accordance with one or more embodiments.

FIG. 9 is a flowchart of a method 900 of facilitating interactions between an action figure such as action figure 101 (FIG. 1), a core such as core 103 (FIG. 1), a physical accessory such as physical accessory 105 (FIG. 1), and a virtual reality environment such as a video game run by a computer 107 (FIG. 1), in accordance with one or more embodiments.

In step 901, a core such as core 103 is added to a body such as action figure 101 or physical accessory 105, wherein the body is associated with a software application implemented by a computer such as computer 107 (FIG. 1).

In step 903, a processor within a housing of the core is communicatively coupled with the computer based, at least in part, on a determination that the housing is added to the body. A physical object such as a physical accessory 105 is optionally communicatively coupled with the body or with the core.

In step 905, the processor of the core causes the computer to generate a virtual representation of one or more of the body, the core, or the physical object in a virtual reality viewable by way of a display associated with the computer. In some embodiments, the virtual reality is a video game environment. In some embodiments, the computer hosts or runs video game software that produces the video game environment.

In step 907, the processor of the core causes the computer to orient the virtual representation of the body, the core and/or the physical object body based on data collected by a sensor included in the core. In some embodiments, orienting the virtual representation of the body, the core and/or the physical object causes the virtual representation of the body, the core and/or the physical object to move in the virtual reality, thereby controlling the virtual representation of the body, the core and/or the physical object based on a movement of the body, the core and/or the physical object and/or the body in the real world. For example, if the body is lifted in the real world, in some embodiments, the virtual version of the body is caused to jump or fly in the virtual reality.

Figure 10:
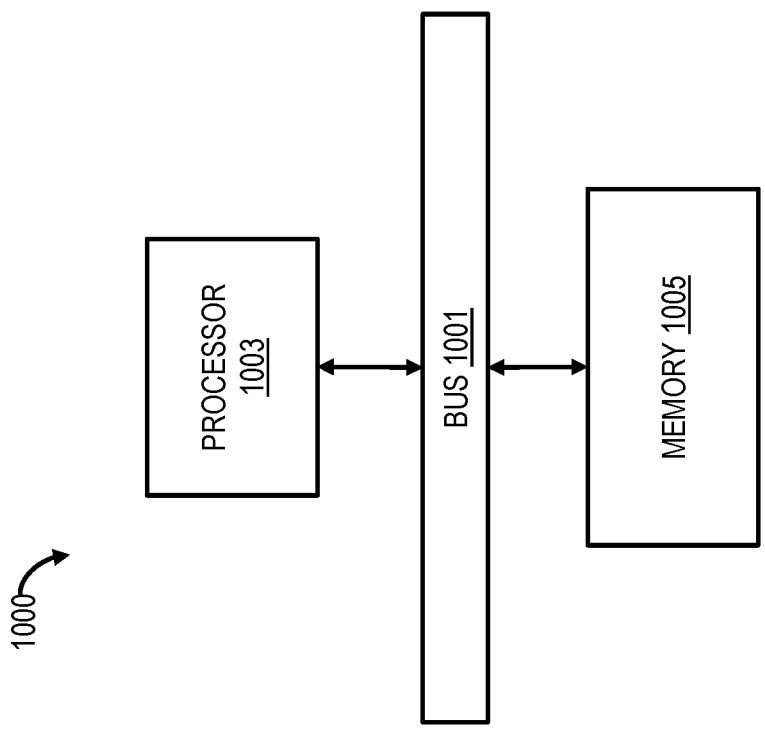
FIG. 10 is a functional block diagram of a computer or processor-based system upon which or by which some embodiments are implemented.

FIG. 10 is a functional block diagram of a computer or processor-based system 1000 upon which or by which an embodiment is implemented.

Processor-based system 1000 is programmed to facilitate interactions between an action figure, a core, a physical accessory, and a virtual reality environment, as described herein, and includes, for example, bus 1001, processor 1003, and memory 1005 components.

In some embodiments, the processor-based system is implemented as a single "system on a chip." Processor-based system 1000, or a portion thereof, constitutes a mechanism for performing one or more steps of facilitating interactions between an action figure, a core, a physical accessory, and a virtual reality environment.

In some embodiments, the processor-based system 1000 includes a communication mechanism such as bus 1001 for transferring information and/or instructions among the components of the processor-based system 1000. Processor 1003 is connected to the bus 1001 to obtain instructions for execution and process information stored in, for example, the memory 1005. In some embodiments, the processor 1003 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 1003. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 1003 performs a set of operations on information as specified by a set of instructions stored in memory 1005 related to facilitate interactions between an action figure, a core, a physical accessory, and a virtual reality environment. The execution of the instructions causes the processor to perform specified functions.

The processor 1003 and accompanying components are connected to the memory 1005 via the bus 1001. The memory 1005 includes one or more of dynamic memory (e.g., RAM, magnetic disk, writable optical disk, etc.) and static memory (e.g., ROM, CD-ROM, etc.) for storing executable instructions that when executed perform the steps described herein to facilitate interactions between an action figure, a core, a physical accessory, and a virtual reality environment. The memory 1005 also stores the data associated with or generated by the execution of the steps.

In one or more embodiments, the memory 1005, such as a random access memory (RAM) or any other dynamic storage device, stores information including processor instructions for facilitating interactions between an action figure, a core, a physical accessory, and a virtual reality environment. Dynamic memory allows information stored therein to be changed by system 100. RAM allows a unit of information stored at a location called a memory address to be stored and retrieved independently of information at neighboring addresses. The memory 1005 is also used by the processor 1003 to store temporary values during execution of processor instructions. In various embodiments, the memory 1005 is a read only memory (ROM) or any other static storage device coupled to the bus 1001 for storing static information, including instructions, that is not changed by the system 100. Some memory is composed of volatile storage that loses the information stored thereon when power is lost. In some embodiments, the memory 1005 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 1003, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is related to an apparatus comprising a housing configured to be added to a body associated with a software application implemented by a computer. The apparatus also comprises a sensor, a transceiver, a power supply, a memory including computer program code for one or more programs, and a processor inside the housing. The processor is communicatively coupled with the sensor, the transceiver, the power supply, and the memory. The processor is configured to execute an instruction from the memory to cause the processor to be communicatively coupled with the computer by way of the transceiver based, at least in part, on a determination that the housing is added to the body. The processor is also configured to cause the computer to generate a virtual representation of the body in a virtual reality viewable by way of a display associated with the computer. The processor is further configured to cause the computer to orient the virtual representation of the body in the virtual reality based on data collected by the sensor.

Another aspect of this description is related to a system comprising a body associated with a software application implemented by a computer. The system also comprises a core. The core comprises a housing configured to be selectively added to the body or selectively removed subtracted from the body, a sensor, a transceiver, a power supply, a memory including computer program code for one or more programs, and a processor inside the housing. The processor is communicatively coupled with the sensor, the transceiver, the power supply, and the memory. The processor is configured to execute an instruction from the memory to cause the processor to be communicatively coupled with the computer by way of the transceiver based, at least in part, on a determination that the housing is added to the body. The processor is also configured to cause the computer to generate a virtual representation of the body in a virtual reality viewable by way of a display associated with the computer. The processor is further configured to cause the computer to orient the virtual representation of the body in the virtual reality based on data collected by the sensor.

A further aspect of this description is related to a method comprising adding a core to a body associated with a software application implemented by a computer. The method also comprises communicatively coupling a processor included within a housing of the core with the computer based, at least in part, on a determination that the housing is added to the body. The method further comprises causing the computer to generate a virtual representation of the body in a virtual reality viewable by way of a display associated with the computer. The method additionally comprises causing the computer to orient the virtual representation of the body in the virtual reality based on data collected by a sensor included in the core.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus comprising:
   a housing configured to be added to a body associated with a software application implemented by a computer;
   a sensor configured to collect data indicative of a real-world orientation of one or more of the housing or the body with respect to a reference position;
   a transceiver;
   a power supply;
   a memory including computer program code for one or more programs; and
   a processor inside the housing, the processor being communicatively coupled with the sensor, the transceiver, the power supply, and the memory,
   wherein the processor is configured to execute an instruction from the memory to:
   cause the processor to be communicatively coupled with the computer by way of the transceiver based, at least in part, on a determination that the housing is added to the body;
   cause the computer to generate a virtual representation of the body in a virtual reality viewable by way of a display associated with the computer;
   cause the computer to orient the virtual representation of the body in the virtual reality based on the data indicative of the real-world orientation of one or more of the housing or the body with respect to the reference position collected by the sensor;
   detect a contact position between a physical object and the body based, at least in part, on a communicative coupling of the physical object with the body and an electrical coupling between the processor and the body, the contact position being at least one of a first contact position or a second contact position different from the first contact position;
   set a function of the physical object to a first function based on a determination that the contact position is the first contact position, or a second function different from the first function based on a determination that the contact position is the second contact position;
   cause the computer to generate a virtual representation of the physical object in the virtual reality;
   cause the computer to orient a virtual version of the physical object with respect to a virtual version of the body based on the contact position; and
   cause the virtual version of the physical object to be usable in accordance with the function of the physical object.

2. The apparatus of claim 1, wherein the processor is configured to determine the housing is added to the body based, at least in part, on an electrical coupling between the processor and the body.

3. The apparatus of claim 2, further comprising:
   a first terminal exposed from the housing, the first terminal being electrically coupled with the processor and configured to contact a second terminal included as a component of the body if the apparatus is added to the body, wherein the electrical coupling between the processor and the body is by way of a contact between the first terminal and the second terminal.

4. The apparatus of claim 3, further comprising:
a third terminal exposed from the housing, the third terminal being configured to be electrically coupled with a fourth terminal included as a component of a modular part,
wherein the housing is configured to be physically coupled with the modular part.

5. The apparatus of claim 2, wherein the housing comprises:
a head portion; and
a shaft portion extending from the head portion,
wherein the shaft portion is configured to be inserted into the body to add the apparatus to the body.

6. The apparatus of claim 5, wherein the head portion is configured to remain outside the body if the shaft portion is inserted into the body.

7. The apparatus of claim 5, wherein the shaft portion comprises a locking member configured to interact with the body to facilitate selective attachment of the apparatus to the body.

8. The apparatus of claim 2, wherein the electrical coupling between the processor and the body is an inductive coupling.

9. The apparatus of claim 2, wherein at least the power supply is electrically coupled with the body by way of an inductive coupling.

10. The apparatus of claim 9, wherein the sensor, the transceiver, the power supply, the memory are inside the housing, and the housing is configured to be entirely accommodated within, and to communicate wirelessly with, the body.

11. The apparatus of claim 10, wherein the housing is spherical.

12. The apparatus of claim 10, wherein the housing is a cube.

13. The apparatus of claim 1, further comprising:
one or more lights communicatively coupled with the processor, the one or more lights being on an exterior of the housing,
wherein the processor is configured to cause at least one of the one or more lights to be on or off based, at least in part, on an instruction received from the computer associated with the software application.

14. The apparatus of claim 1, further comprising:
one or more user input sensors communicatively coupled with the processor, the one or more user input sensors being configured to receive a user input associated with the software application implemented by the computer
wherein the processor is configured to cause a communication to be sent to the computer associated with the software application based on an input received from a user by way of at least one of the one or more user input sensors.

15. The apparatus of claim 14, wherein at least one of the one or more user input sensors comprises a depressible button on an exterior of the housing.

16. The apparatus of claim 1, wherein the sensor is a sensor package comprising one or more of an accelerometer, a gyroscope or an altimeter.

17. The apparatus of claim 1, further comprising:
a motor communicatively coupled with the processor, wherein the processor is further configured to cause the motor to move based, at least in part, on a communication received from the computer associated with the software application, and
the motor is configured to cause the apparatus to vibrate the body if the apparatus is added to the body.

18. A system, comprising:
a body associated with a software application implemented by a computer;
a core, comprising:
a housing configured to be selectively added to the body or selectively removed subtracted from the body;
a sensor configured to collect data indicative of a real-world orientation of one or more of the housing or the body with respect to a reference position;
a transceiver;
a power supply;
a memory including computer program code for one or more programs; and
a processor inside the housing, the processor being communicatively coupled with the sensor, the transceiver, the power supply, and the memory, wherein the processor is configured to execute an instruction from the memory to:
cause the processor to be communicatively coupled with the computer by way of the transceiver based, at least in part, on a determination that the housing is added to the body;
cause the computer to generate a virtual representation of the body in a virtual reality viewable by way of a display associated with the computer;
cause the computer to orient the virtual representation of the body in the virtual reality based on the data indicative of the real-world orientation of one or more of the housing or the body with respect to the reference position collected by the sensor;
detect a contact position between a physical object and the body based, at least in part, on a communicative coupling of the physical object with the body and an electrical coupling between the processor and the body, the contact position being at least one of a first contact position or a second contact position different from the first contact position;
set a function of the physical object to a first function based on a determination that the contact position is the first contact position, or a second function different from the first function based on a determination that the contact position is the second contact position;
cause the computer to generate a virtual representation of the physical object in the virtual reality;
cause the computer to orient a virtual version of the physical object with respect to a virtual version of the body based on the contact position; and
cause the virtual version of the physical object to be usable in accordance with the function of the physical object.

19. A method, comprising:
adding a core to a body associated with a software application implemented by a computer;
communicatively coupling a processor included within a housing of the core with the computer based, at least in part, on a determination that the housing is added to the body;

causing the computer to generate a virtual representation of the body in a virtual reality viewable by way of a display associated with the computer;

causing the computer to orient the virtual representation of the body in the virtual reality based on data collected by a sensor included in the core;

detecting a contact position between a physical object and the body based, at least in part, on a communicative coupling of the physical object with the body and an electrical coupling between the processor and the body, the contact position being at least one of a first contact position or a second contact position different from the first contact position;

setting a function of the physical object to a first function based on a determination that the contact position is the first contact position, or a second function different from the first function based on a determination that the contact position is the second contact position;

causing the computer to generate a virtual representation of the physical object in the virtual reality;

causing the computer to orient a virtual version of the physical object with respect to a virtual version of the body based on the contact position; and causing the virtual version of the physical object to be usable in accordance with the function of the physical object, wherein the data collected by the sensor is indicative of a real-world orientation of one or more of the housing or the body with respect to a reference position.

* * * * *